(12) United States Patent
Panpaliya et al.

(10) Patent No.: US 9,370,023 B2
(45) Date of Patent: Jun. 14, 2016

(54) METHOD AND APPARATUS FOR RESOLVING CALL COLLISIONS IN A DIGITAL CONVENTIONAL DIRECT MODE

(71) Applicant: MOTOROLA SOLUTIONS, INC., Schaumburg, IL (US)

(72) Inventors: Satyanarayan R. Panpaliya, Palatine, IL (US); Dipendra M. Chowdhary, Hoffman Estates, IL (US); Sanjaykumar S. Karpoor, Buffalo Grove, IL (US); Badarinath Patibandla, Schaumburg, IL (US); David G. Wiatrowski, Woodstock, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 263 days.

(21) Appl. No.: 13/793,621

(22) Filed: Mar. 11, 2013

(65) Prior Publication Data

US 2014/0254458 A1    Sep. 11, 2014

(51) Int. Cl.
*H04H 20/71* (2008.01)
*H04W 74/08* (2009.01)
*H04W 76/02* (2009.01)
*H04W 72/12* (2009.01)
*H04W 72/14* (2009.01)
*H04W 92/18* (2009.01)

(52) U.S. Cl.
CPC ...... *H04W 74/0816* (2013.01); *H04W 72/1242* (2013.01); *H04W 72/14* (2013.01); *H04W 76/023* (2013.01); *H04W 76/027* (2013.01); *H04W 92/18* (2013.01)

(58) Field of Classification Search
None
See application file for complete search history.

(56) References Cited

U.S. PATENT DOCUMENTS 5,200,951 A     4/1993   Grau
5,550,907 A     8/1996   Carlsen
5,896,572 A     4/1999   Scotton
(Continued)

FOREIGN PATENT DOCUMENTS

EP          1622406 A1       2/2006
WO     2007065801 A1      11/2006
(Continued)

OTHER PUBLICATIONS

Corresponding International Application No. PCT/US2014/018610—International Search Report dated Sep. 23, 2014.
(Continued)

*Primary Examiner* — Willie J Daniel, Jr.
(74) *Attorney, Agent, or Firm* — Daniel R. Bestor; Barbara R. Doutre

(57) ABSTRACT

A process for resolving call collisions in a digital conventional direct mode includes monitoring a direct mode communication channel for transmissions from other direct mode radios in the plurality of direct mode radios. In response to detecting a new call request: identifying a last radio to transmit on the direct mode channel, transmitting a new call request for receipt by the last direct mode radio to transmit, monitoring the direct mode channel for a response from the last radio to transmit, and if a call grant granting the new call request is received from the last radio to transmit, initiating the new direct mode call on the direct mode communication channel. If the call grant is not received, at least temporarily refraining from initiating the new direct mode call.

16 Claims, 5 Drawing Sheets

(56) References Cited

U.S. PATENT DOCUMENTS

| | | | |
|---|---|---|---|
| 5,926,764 | A | 7/1999 | Sarpola et al. |
| 6,141,347 | A | 10/2000 | Shaughnessy et al. |
| 7,499,441 | B2 | 3/2009 | Wiatrowski et al. |
| 7,586,858 | B2 | 9/2009 | Paltemaa |
| 7,606,569 | B2 | 10/2009 | Hori |
| 8,055,290 | B1 | 11/2011 | Cai et al. |
| 8,059,613 | B1 | 11/2011 | Barrow |
| 2004/0190468 | A1* | 9/2004 | Saijonmaa .......... 370/312 |
| 2005/0201308 | A1* | 9/2005 | Sekiya et al. .......... 370/310 |
| 2007/0171886 | A1 | 7/2007 | Lewis et al. |
| 2008/0186943 | A1 | 8/2008 | Wiatrowski et al. |
| 2011/0255521 | A1 | 10/2011 | Bohn et al. |
| 2012/0002684 | A1* | 1/2012 | Tay .......... 370/503 |
| 2012/0233266 | A1 | 9/2012 | Hassan et al. |

FOREIGN PATENT DOCUMENTS

| | | | |
|---|---|---|---|
| WO | 2012118448 | A1 | 9/2012 |
| WO | 2012158849 | A2 | 11/2012 |

OTHER PUBLICATIONS

Final draft ETSI EN 300 396-2 V1.3.0 (May 2006) European Standard (Telecommunications series); "Terrestrial Trunked Radio (TETRA); Technical requirements for Direct Mode Operation (DMO); Part 2: Radio aspects."

ETSI EN 300 396-3 V1.4.1 (Dec. 2011) European Standard; "Terrestrial Trunked Radio (TETRA); Technical Requirements for Direct Mode Operation (DMO); Part 3: Mobile Station to Mobile Station (MS-MS) Air Interface (A1) Protocol." ETSI, 650, Route Des Lucioles; F-06921.

Motorola—MOTOTRBO® System Release Notes Version 1.8—Professional Commercial Radios (PCR) & Accessories, Version: 1.8, Date: Jun. 7, 2011, MOL Release: 1.8.

Motorola—MOTOTRBO® System Release Notes Professional Commercial Radios (PCR) & Accessories, Version: 1.8.2, Date: Jul. 27, 2011, MOL Release: 1.8.2.

* cited by examiner

METHOD AND APPARATUS FOR RESOLVING CALL COLLISIONS IN A DIGITAL CONVENTIONAL DIRECT MODE

FIELD OF THE DISCLOSURE

The present disclosure relates generally to wireless communications and more particularly to direct mode call collision avoidance in a digital conventional direct mode communications system.

BACKGROUND

The European Telecommunications Standard Institute-Digital Mobile Radio (ETSI-DMR) is a direct digital replacement for analog Private Mobile Radio (PMR). DMR is a scalable system that can be used in unlicensed mode (in a 446.1 to 446.2 MHz band), and in licensed mode, subject to national frequency planning ETSI standards or specifications referred to herein may be obtained by contacting ETSI at ETSI Secretariat, 650, route des Lucioles, 06921 Sophia-Antipolis Cedex, FRANCE.

DMR provides improved range, higher data rates, more efficient use of spectrum, and improved battery life over prior direct mode protocols. Features supported include fast call set-up, calls to groups and individuals, and short data and packet data calls. Supported communications modes include individual calls, group calls, and broadcast calls provided via a direct communication mode among the radios operating within the network. Other direct mode functions such as emergency calls, priority calls, full duplex communications, short data messages and Internet Protocol (IP)-packet data transmissions are also supported.

Direct mode, more generally, is a mode of operation where radios may communicate within a network without the assistance of one or more infrastructure equipment (e.g., base stations or repeaters). A radio, as used herein, can be mobile and/or fixed end equipment that is used to obtain direct mode communications services. Direct mode operation is contrasted with a conventional repeater mode, which is a mode of operation where radios communicate with one another through infrastructure equipment such as a repeater or base station. Direct mode, therefore, can provide a more efficient and less costly communication system operation than repeater mode operation.

The ETSI-DMR standard provides for 12.5 Kilohertz (KHz) operation in direct mode (systems that exclusively communicate without a repeater). The 12.5 KHz operation refers to 12.5 KHz spectral efficiency in which there are two communication paths per 12.5 KHz of radio frequency (RF) spectrum. The 12.5 direct mode utilizes 27.5 millisecond (msec) pulsed (every 60 msec) radio transmissions on each of the logical channels. In the 12.5 direct mode of operation, radios transmit asynchronously and radios within range of the transmission synchronize themselves to that transmission for the purposes of receiving the transmission, but any transmissions in response to the first transmission are transmitted asynchronously.

Other direct mode protocols, perhaps consistent with the Project 25 (P25) standard defined by the Association of Public Safety Communications Officials International (APCO) and standardized under the Telecommunications Industry Association (TIA), or with the terrestrial trunked radio (TETRA) standard also defined by the ETSI, may operate in a similar manner and may be used in addition to or in place of the DMR protocol. Communications in accordance with any one or more of these direct mode communication standards, or other standards, may take place over physical channels in accordance with one or more of a TDMA (time division multiple access), FDMA (frequency divisional multiple access), or CDMA (code division multiple access) protocol.

In prior analog direct mode communications systems, two or more simultaneous direct mode transmissions can be mixed at the RF level and the recipient thus able to hear the mixture of all the conversations. However, in a digital conventional direct mode consistent with any one of the foregoing mentioned standards, two or more sources transmitting simultaneously would corrupt both of the digital transmissions and, as a result, the recipients would not hear any conversation. Even worse, the simultaneously transmitting digital radio users would not be aware of the corrupted transmission and may (incorrectly) assume that the transmissions reached their respective targeted group of recipient digital direct mode radios. This issue is further exacerbated in digital direct mode group calls, where the number of digital direct mode radios in the group (e.g., more than five) increases the odds that simultaneous transmissions would conflict.

Accordingly, there is a need to provide an improved call collision arbitration process and apparatus in digital conventional direct mode communication systems in order to improve the robustness of the communications systems and ensure that digital transmissions are not corrupted by multiple simultaneous direct mode digital transmissions.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
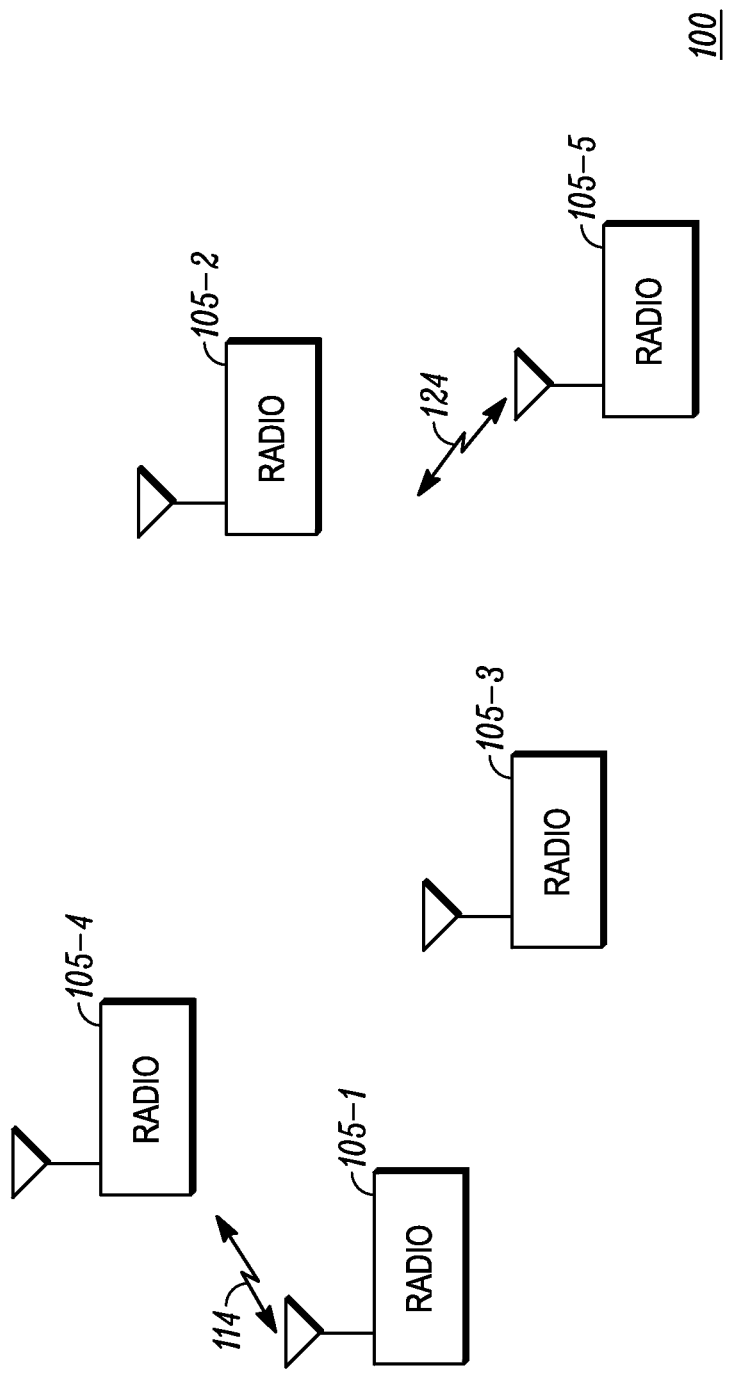
FIG. 1 is a block diagram of an illustrative digital conventional direct mode wireless communications system operating in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In light of the foregoing, it would be advantageous to provide for a method and device that monitors direct mode communications, detects new call requests, identifies a last radio to transmit, transmits a new call request to the last radio to transmit, monitors for a response from the last one of the other direct mode radios to transmit on the direct mode communication channel, and acts accordingly based on whether or not an acknowledgement of the call request is received from the last one of the direct mode radios to transmit. Similarly, it would be advantageous to provide for a method and device for a last-to-transmit radio to arbitrate and grant or not grant subsequent new call requests in a direct mode communication channel.

In one embodiment, a process for resolving call collisions in a digital conventional direct mode includes monitoring a direct mode communication channel for transmissions from other direct mode radios in the plurality of direct mode radios. In response to detecting a new call request: identifying a last radio to transmit on the direct mode channel, transmitting a new call request for receipt by the last direct mode radio to transmit, monitoring the direct mode channel for a response from the last radio to transmit, and if a call grant granting the new call request is received from the last radio to transmit, initiating the new direct mode call on the direct mode communication channel. If the call grant is not received, at least temporarily refraining from initiating the new direct mode call.

In another embodiment, a process for resolving call collisions in a digital conventional direct mode includes transmitting, on a direct mode communication channel, one or more transmissions during a first direct mode call to the other direct mode radios in the plurality of direct mode radios, the transmissions including an identifier identifying the first direct mode radio, and after making the last transmission of the first direct mode call, transitioning to an arbitrating mode and monitoring the direct mode communication channel for any new direct mode call requests from other direct mode radios in the plurality of direct mode radios. While monitoring the direct mode channel, receiving, from a second direct mode radio out of the plurality of direct mode radios, a first new direct mode call request, and continuing to monitor the direct mode communication channel for any additional new direct mode call requests from other direct mode radios in the plurality of direct mode radios. Responsive to determining that (i) no other new direct mode call requests have been received or (ii) other new direct mode call requests have been received but the first new direct mode call request is entitled to priority over the other new call requests: broadcasting a call grant granting the first new direct mode call request of the second direct mode radio, the call grant including an identifier identifying the second direct mode radio, and receiving and playing back content received from the second direct mode radio broadcast over the direct mode communication channel during the first new direct mode call granted by the acknowledgment.

Each of the above-mentioned embodiments will be discussed in more detail below, starting with example network and device architectures of the system in which the embodiments may be practiced, followed by a discussion of resolving call collisions in a digital conventional direct mode communication system from the point of an initiating radio and then from the point of view of an arbitrating/last transmitting radio. Further advantages and features consistent with this disclosure will be set forth in the following detailed description, with reference to the figures.

I. Network and Device Architectures

Referring now to FIG. 1, an example of a digital conventional direct mode wireless communications system 100 comprising a plurality of radios 105 operating in accordance with an embodiment is illustrated. Radios 105-1 through 105-5 communicate with each other on direct mode radio frequencies without communicating through any infrastructure including, for example, a repeater or base station. It will be appreciated by those of ordinary skill in the art that in some embodiments the frequency could also have repeaters on it, but radios 105 may not use those repeaters (e.g., the repeaters could belong to a different system, or the radios are operating in a talk-around mode).

A radio, as used herein, can be mobile and/or fixed end equipment that is used to obtain direct mode wireless communications services. For example, a radio can be a mobile radio (i.e. a portable radio, a mobile station, a subscriber unit, a mobile subscriber), or can be a fixed station (i.e. a fixed control station, a base station, and any supporting equipment such as wireline consoles and packet data switches). Each radio is capable of communicating directly with one or more other radios using techniques as further described herein, such as TDMA, in which specified time segments are divided into assigned time slots for individual communications and each radio frequency (RF) in the system carries time slots whereby each time slot is known as a "channel." In the case of FDMA communications, channels may be separated by frequency, and in CDMA communications, channels may be separated by spreading code.

For ease of describing the embodiments hereinafter, the digital conventional direct mode wireless communications system 100 is presumed to be a two time slot TDMA communications system in accordance with the ETSI-DMR standard. Thus, in the embodiments described below, since there are two time slots, there are two channels available on each radio frequency for carrying the traffic of the system. A time slot is an elementary timing of the physical channel. For example, in one embodiment consistent with the ETSI-DMR standard for repeater-based communications, a time slot has a length of thirty milliseconds (30 ms) and is numbered "1" or "2". In another example, and consistent with the ETSI-DMR direct mode, only one of the two time slots is used for direct mode communications, leaving one 27.5 ms timeslot numbered "1" (after eliminating unnecessary 1.25 ms guard intervals). It is important to note, however, that the TDMA communication system may have other slot lengths and slotting ratios, as well.

Figure 2:
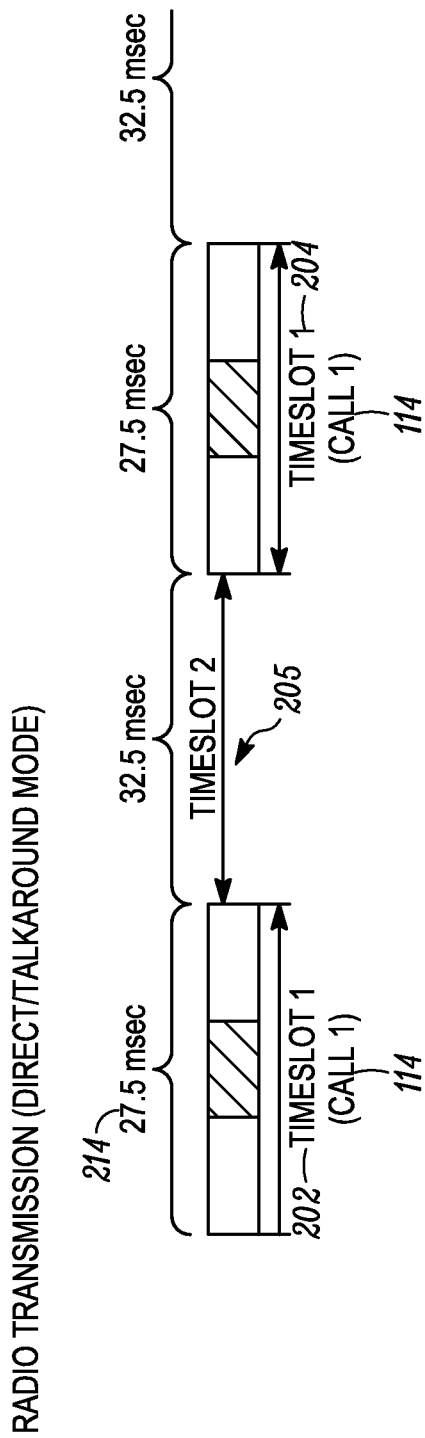
FIG. 2 is a timing diagram illustrating one example of a call transmission in a digital conventional direct mode wireless communication system in accordance with an embodiment.

As discussed above, and illustrated further in the transmission diagram 200 of FIG. 2, within the present ETSI-DMR direct mode systems, in the 12.5 KHz direct mode of operation, radios transmit asynchronously (because there is no common time slot reference available) and radios within range of the transmission synchronize themselves to that transmission for the purposes of receiving the transmission, but any transmissions in response to the first transmission are transmitted asynchronously. At present, and in one mode, there is an unused 32.5 ms portion 205 of the channel according to the standard (used in the repeater mode for a $2^{nd}$ timeslot/channel). In another mode, an additional $2^{nd}$ timeslot/direct mode channel is provided in the unused 32.5 ms portion 205, and the radios transmit synchronously.

Figure 4:
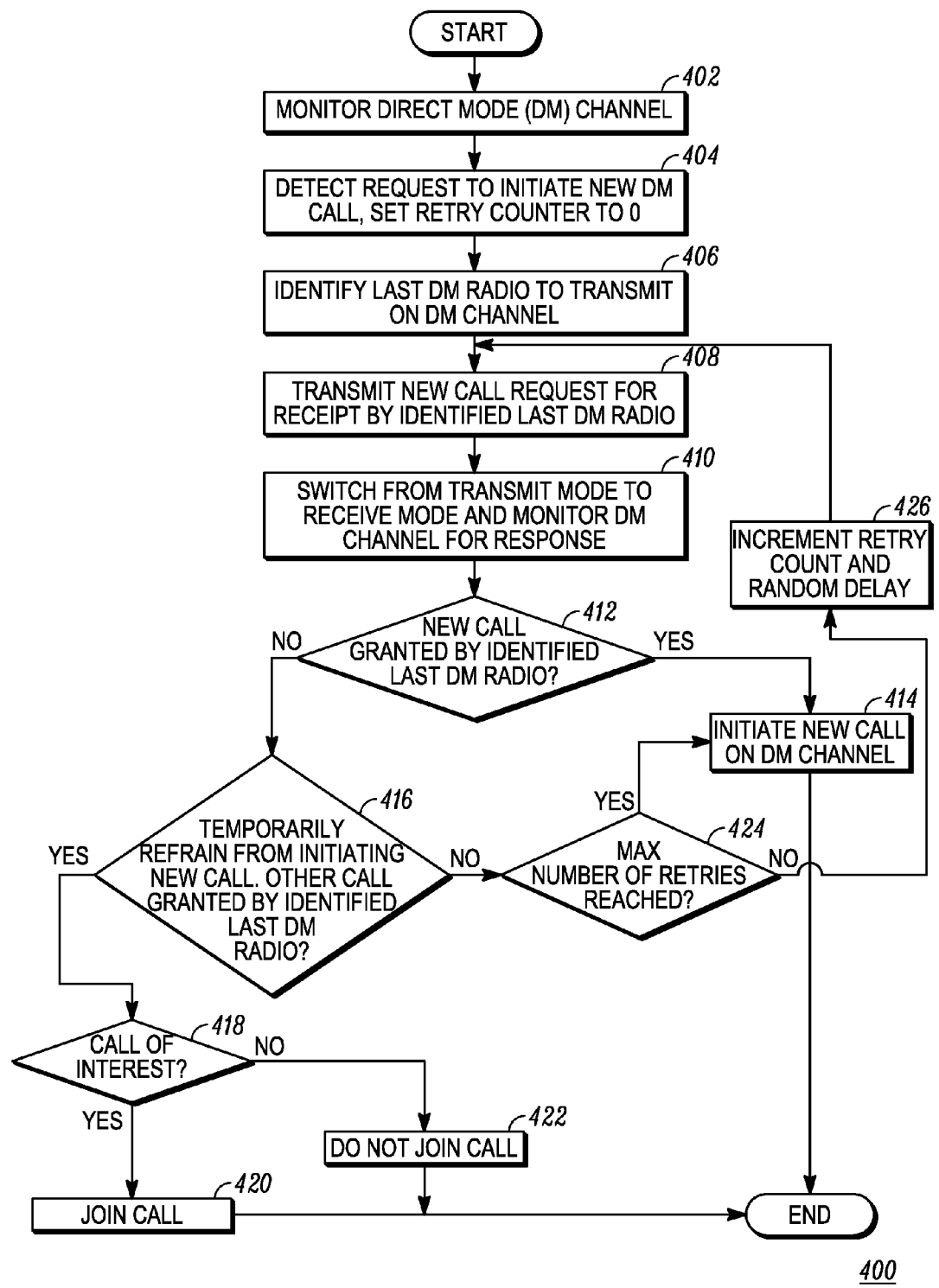
FIG. 4 is a flowchart illustrating a process, executable at an initiating direct mode radio for resolving call collisions in a digital conventional direct mode wireless communication system in accordance with some embodiments.
Figure 5:
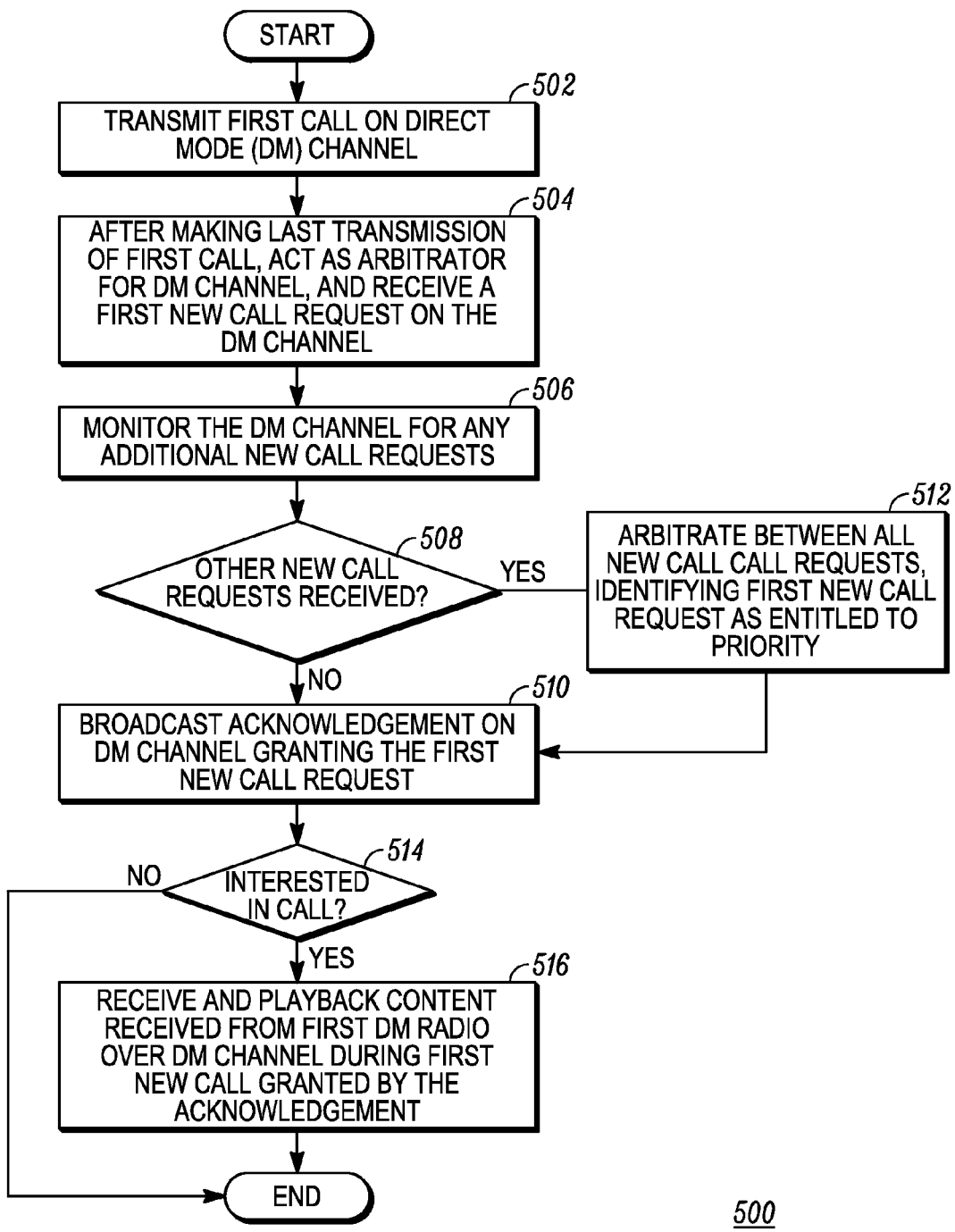
FIG. 5 is a flowchart illustrating a process, executable at an arbitrating/last transmitting direct mode radio for resolving call collisions in a digital conventional direct mode wireless communication system in accordance with some embodiments.

Radios 105-1-105-5 may directly communicate over a single shared RF frequency in accordance with the ETSI-DMR standard. For example, radio 105-1 in digital conventional direct mode communication system 100 may initiate a new direct mode call 114 to radios 105-2-105-5 on a timeslot 1 202, as illustrated in the timing diagram 200 of FIG. 2. Timeslot 1 202 includes a 27.5 ms payload period 214 that includes a sync slot 216. At substantially the same time that radio 105-1 initiates its new call, radio 105-5 in digital conventional direct mode communication system 100 may, having no knowledge of the direct mode call 114, similarly initiate a new direct mode call 124 to radios 105-1-105-4 on the same direct mode channel (e.g., during the same timeslot 1 202 of FIG. 2). Assuming there is no arbitration on the channel, radio 105-1's and radio 105-5's transmissions during a same time period would likely corrupt each other, and as a result, radios 105-2-105-4 would not receive either of the digital calls being transmitted by radios 105-1 and 105-5. FIGS. 4 and 5, below, illustrate (with respect to FIGS. 1 and 2) a method for resolving this type of call collision in digital conventional direct mode communications systems.

Figure 3:
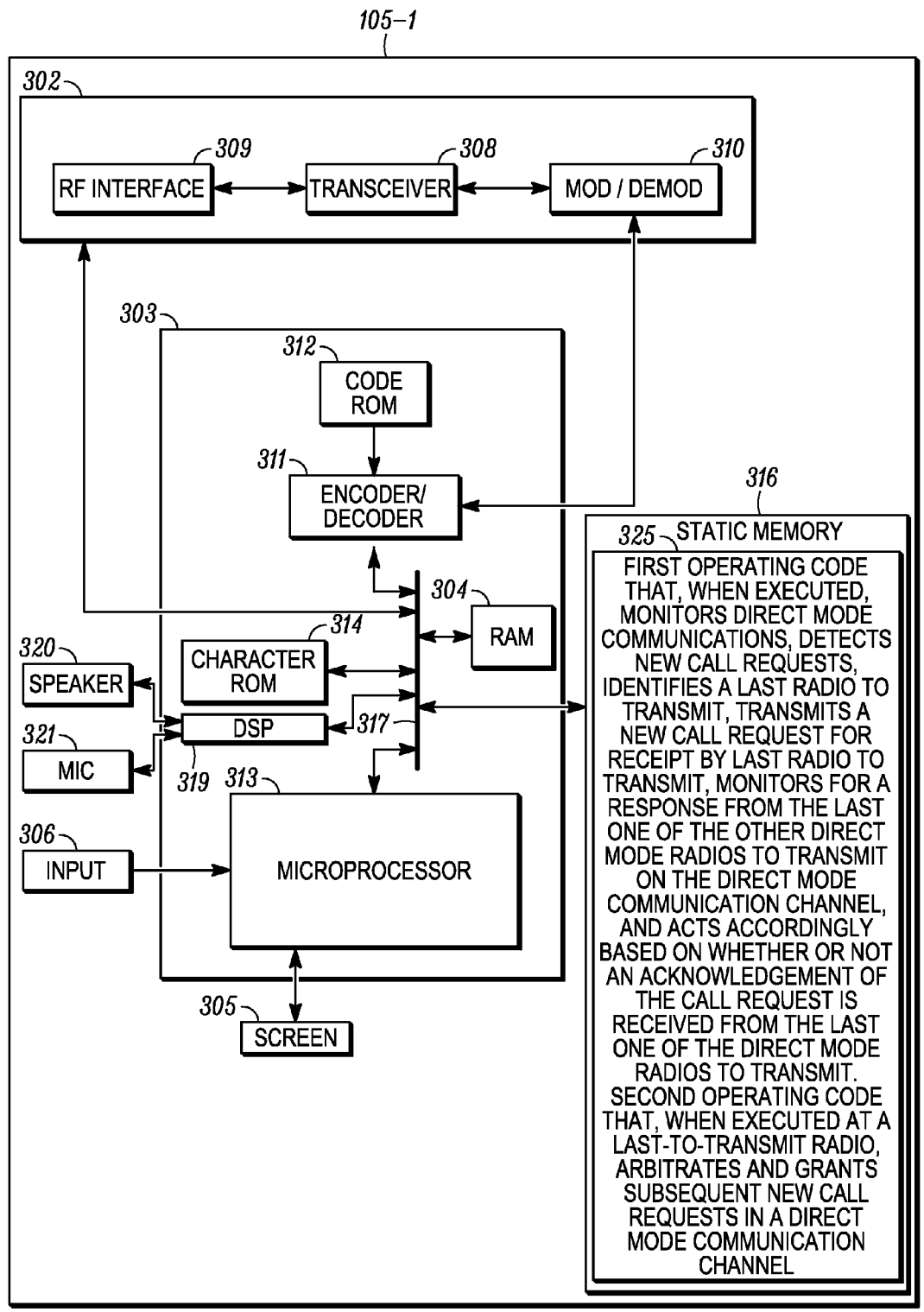
FIG. 3 is a block diagram of a direct mode wireless radio operable in the digital conventional direct mode wireless communications system of FIG. 1 in accordance with some embodiments.

FIG. 3 is an example functional block diagram of a direct mode radio, such as radio 105-1 operating within the system 100 of FIG. 1 in accordance with some embodiments. Other direct mode radios, such as radios 105-2-105-5, may contain same or similar structures. As shown in FIG. 3, radio 105-1 includes a communications unit 302 coupled to a common data and address bus 317 of a processing unit 303. The radio 105-1 may also include an input unit (e.g., keypad, pointing device, etc.) 306, an output transducer unit (e.g., speaker) 320, an input transducer unit (e.g., a microphone) 321, and a display screen 305, each coupled to be in communication with the processing unit 303.

The processing unit 303 may include an encoder/decoder 311 with an associated code Read Only Memory (ROM) 312 for storing data for encoding and decoding voice, data, control, and/or other signals that may be transmitted or received between other radios within direct mode communication range of radio 105-1. The processing unit 303 may further include a microprocessor 313 coupled, by the common data and address bus 317, to the encoder/decoder 311, a character ROM 314, a Random Access Memory (RAM) 304, and a static memory 316. The processing unit 303 may also include a digital signal processor (DSP) 319, coupled to the speaker 320, the microphone 321, and the common data and address bus 317, for operating on audio signals received from one or more of the communications unit 302, the static memory 316, and the microphone 321.

The communications unit 302 may include an RF interface 309 configurable to communicate directly with other direct mode radios, such as radios 105-2 to 105-5. The communications unit 302 may include one or more wireless transceivers 308, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g, 802.11n), a WiMAX transceiver perhaps operating in accordance with an IEEE 802.16 standard, and/or other similar type of wireless transceiver configurable to communicate via a wireless network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding and/or encoding data such as control messages and/or data or voice messages that may be transmitted or received by the radio 105-1. Static memory 316 may store operating code for the microprocessor 313 that, when executed, monitors direct mode communications, detects new call requests, identifies a last radio to transmit, transmits a new call request for receipt by the last radio to transmit, monitors for a response from the last one of the other direct mode radios to transmit on the direct mode communication channel, and acts accordingly based on whether or not an acknowledgement of the call request is received from the last one of the direct mode radios to transmit, in accordance with one or more of FIGS. 4-5 and corresponding text. Static memory 316 may additionally or alternatively store operating code for the microprocessor 313 that, when executed, allows a last-to-transmit radio to arbitrate and grant or not grant subsequent new call requests in a direct mode communication channel in accordance with one or more of FIGS. 4-5. Static memory 316 may comprise, for example, a hard-disk drive (HDD), an optical disk drives such as a compact disk (CD) drive or digital versatile disk (DVD) drive, a solid state drive (SSD), a flash memory drive, or a tape drive, to name a few.

II. The Process of Resolving Call Collisions in a Digital Conventional Direct Mode FIGS. 4-5 set forth examples of a method for resolving call collisions in a digital conventional direct mode, from the point of view of, and executable at, a new call initiating radio device (FIG. 4) and then from the point of view of, and executable at, an arbitrating/last transmitting radio device (FIG. 5). In the following process flow diagrams, examples will be described with respect to FIGS. 1 and 2, in which it is assumed that radios 105-1 to 105-5 are all on a same system (e.g., use the same color code or other system identifier to distinguish their calls from other calls that may also occur on a same direct mode frequency), 105-2 was the last radio transmit on the system, and that radio 105-1 transmits a new call request first.

FIG. 4 sets forth an example process flow 400 in which a new call initiating radio device, perhaps radio 105-1 of FIG. 1, helps to resolve call collisions in a digital conventional direct mode. At step 402, an initiating direct mode radio monitors a direct mode channel (e.g., frequency, time slot, and/or code) with which it is associated for transmissions from other direct mode radios that transmit with a same system (or group) identifier with which the initiating direct mode radio is associated. For example, radio 105-1 monitors a direct mode TDMA channel for transmission from other radios (e.g., 105-2 to 105-5) that identify with the same system identifier or group identifier. In one embodiment, the system identifier may be a color code, and the radio 105-1 may monitor a direct mode TDMA channel for transmission from other radios with a same color code as it is configured with (e.g., 0001, 0101, or 1111). In another embodiment, the system identifier may be a group identifier such as a talkgroup identifier.

If a transmission is detected at step 402 from a radio on a system or group as the monitoring radio, the initiating radio decodes the transmission and locates a source ID for the transmission (identifying the source radio), and records the source ID in local storage as a last-transmitting radio. The source ID could be a hardware identifier pre-provisioned into the radio (perhaps in accordance with the DMR standard), a MAC address, an IP address, or some other identifier capable of uniquely identifying the radio doing the transmitting. The transmission containing the source ID could be a link control (LC) burst, an embedded LC burst, a voice header, a preamble control signaling block (CSBK), or any other signaling, voice, or data burst that includes a source ID identifying the transmitting radio. In some embodiments, call request and call grant bursts are not considered in identifying the last radio to transmit.

During the monitoring of step 402, transmissions received that include a system identifier or talkgroup identifier that is not associated with a same system identifier talkgroup with which the initiating radio is associated may simply be discarded, without recording or otherwise storing the identity of the radio doing the transmitting.

At step 404, the initiating radio detects a request to initiate a new direct mode call on the direct mode channel. For example, direct mode radio 105-1 of FIGS. 1 and 3 may detect a request to transmit a new direct mode call via a detected activation of a PTT input 306 indicating a user's desire to transmit a new direct mode call (perhaps as a function of an indicated group or channel selected via a separate channel knob input 306). Other types of inputs, including voice-activated or touch-activated, could additionally or alternatively cause the initiating radio to detect a request to initiate the new direct mode call. Also at step 404, the direct mode radio sets an internal retry counter to 0.

At step 406, and responsive to detecting the request to initiate the new direct mode call, the initiating radio identifies the last direct mode radio to transmit (e.g., the most recent or immediately previous radio to transmit) on the direct mode channel. In one embodiment, this may be the last direct mode radio to transmit with a same system identifier or group identifier with which the initiating radio is also associated, and may be a source ID retrieved from storage after the monitoring at step 402. In some embodiments in which there is no known last transmitting radio, or the previously identified and/or stored last transmitting radio actively has indicated that it is powering down or otherwise leaving the area and would no longer be available to arbitrate direct mode calls, the initiating radio may identify a transmitting radio prior to the last transmitting radio, may identify itself as the last transmitting radio, or may assign a random or pseudo-random identifier as the last transmitting radio source ID. Other possibilities exist as well.

At step 408, and assuming the direct mode channel is currently idle, the initiating radio transmits a new call request on the direct mode channel for receipt by the last known transmitting radio that was identified at step 406. The request may be, for example, a voice header or a preamble control signaling block (CSBK), or any other signaling, voice, or data burst acting as a new call request and populated with the source ID of the identified last direct mode radio from step 406 as the target device for the new call request. The request may be transmitted directly to the last direct mode radio (e.g., identify the last direct mode radio as a target of the request), or may be transmitted or broadcast in some other manner for receipt by the last direct mode radio (e.g., identify some other radio such as the desired target radio for the new call, in which case the last radio to transmit may still be configured to intercept and respond to such a formatted request). Other examples are possible as well.

At step 410, the initiating radio switches from transmit mode to receive mode and monitors the direct mode channel for a response from the identified last direct mode radio (e.g., the "arbitrating radio" for the direct mode call). At step 412, the initiating direct mode radio determines if the arbitrating radio granted its call request or not. For example, it may monitor the direct mode channel for a call grant from the identified last direct mode radio that includes the initiating radio's source ID. In one embodiment, the call grant may be a repeated version of the call request, with flipped source and destination identifiers, and could be transmitted in the form of a call header or CSBK.

Assuming a call grant is received at step 412 granting the initiating direct mode radio's new call request, processing proceeds to step 414, where the initiating direct mode radio transmits the new call on the direct mode channel. The new call may be a private call (radio to radio), a group call (radio to group via multicast or broadcast), or a broadcast call (radio to all).

On the other hand, if the initiating direct mode radio does not receive the call grant granting the requested new call at step 412 within some threshold period of time (such as between 60 and 180 ms, and in one embodiment, 120 ms), processing proceeds to step 416, where the initiating direct mode radio refrains from initiating the new call for at least a temporary period of time (e.g., until some further determination is made), up to a configurable maximum period of time such as 180 ms. Further at step 416, the initiating direct mode radio may determine at step 416 whether a call grant is received that identifies some other radio than the initiating direct mode radio, but e.g., with the same system or group identifier as the initiating radio. For example, the radio 105-1 may monitor the direct mode channel and see a call grant (perhaps with a same color code of "0001" with which may be associated) from arbitrating/last known transmitting radio 105-2 that identifies radio 105-5 as the target of the call grant. If it is determined that a new call grant was transmitted granting a new call to some radio other than the initiating radio, processing proceeds to step 418, where the initiating direct mode radio determines whether the call granted to the other radio is of interest to the initiating direct mode radio (e.g., the grant identifies a same color code and/or group with which the initiating direct mode is associated or subscribed).

If the call is of interest, the initiating direct mode radio joins the new call on the direct mode channel at step 420, including receiving, decoding, and playing back content (e.g., voice, audio, and/or video) received via the direct mode channel, and correspondingly updating the identity of the last radio to transmit. At step 420, the radio may also provide some audio or visual indication to its user, perhaps via a display such as screen 305 or speaker such as speaker 320, that the new call requested at step 404 cannot be completed (e.g., was denied). On the other hand, if it is determined that the call is not of interest to the initiating direct mode radio at step 418, processing proceeds to step 422, where the initiating direct mode radio refrains from joining the new call, but may still provide some audio or visual indication to its user, perhaps via the display or the speaker, that the new call requested at step 404 cannot be completed, and may still and correspondingly update the identity of the last radio to transmit.

Returning to step 416, if it is determined that no other call grants have been received on the direct mode channel, the initiating direct mode radio may assume that there was some problem in transmitting the new call request to the arbitrating radio, some problem in the arbitrating radio processing the request, or some problem in receiving the call grant at the initiating radio, among other possibilities. Processing thus proceeds to step 424, where the initiating radio determines whether a maximum number of retries has been reached. For example, if the identified last direct mode radio is known at step 406, the maximum number of retries may be in the range of 2-5. On the other hand, if the identified last direct mode radio is not known, or the last direct mode radio actively withdrew its arbitrator status, the maximum number of retries may be reduced to the range of 1-3. In any event, if the maximum number of retries has been reached at step 424 (e.g., the retry counter is equal to or greater than the maximum), processing proceeds to step 414, where the initiating direct mode radio initiates the new call on the direct mode channel despite the non-receipt of a call grant from a known or unknown arbitrating radio (and assuming that the channel is determined to be clear).

Returning to step 424, if it is determined that the maximum number of retries has not been reached, processing proceeds to step 426, where the retry counter is incremented and a random delay (configurable and preferably within the range of 0 to 720 ms) applied before proceeding back to step 408 and re-transmitting the new call request to the identified last direct mode radio. The random delay (back-off) applied at step 426 is intended to prevent a recurrence of interference between two initiating direct mode radios that may have caused the last new call request transmitted at step 408 to not be fully or accurately received by the last transmitting direct mode radio.

FIG. 5 sets forth an example process flow 500 in which an arbitrating/last transmitting radio device helps to resolve call collisions in a digital conventional direct mode communications system. At step 502, the arbitrating direct mode radio transmits a first call on a direct mode channel. At step 504, and after making the last transmission of the first call, the arbitrating direct mode radio transitions to an arbitrator role by switching to a receive mode while tuned to the direct mode channel and monitoring the direct mode channel for any new direct mode call requests from other direct mode radios that transmit with a same system (or group) identifier with which the arbitrating direct mode radio is associated. Also at step 504, and while in the receive mode, the arbitrating direct mode radio receives a first new call request on the direct mode channel, addressed to the arbitrating direct mode radio or some other radio, and including a source ID identifying the requesting (e.g., initiating) direct mode radio.

At step 506, the arbitrating direct mode radio continues to monitor the direct mode channel for a period of time (up to a configurable maximum period of time such as 180 ms) to determine whether any additional new call requests have been transmitted. For example, the arbitrating direct mode radio may continue monitoring the direct mode channel for 120 ms to aid in preventing a collision of call grant with a delayed call request from another radio. While acting as an arbitrator at step 506, and in response to one of a received instruction to power-off or otherwise disable its transceiver, or in response to an error condition indicative of an inability to receive transmissions over the direct mode communications channel, the arbitrating direct mode radio may broadcast an announcement indicating that the radio will no longer be available to arbitrate new call requests on the direct mode channel.

At step 508, the arbitrating direct mode radio determines whether any other new call requests were received. If not, processing continues to step 510, where the arbitrating direct mode radio broadcasts a call grant granting the first new call request to the requesting direct mode radio. On the other hand, if additional other new call requests were received at step 508, processing proceeds to step 512, where the arbitrating direct mode radio arbitrates between the two or more new call requests received. The arbitrating direct mode radio may use any number of known techniques for determining which call to grant, including considering an order in which the requests were received (giving higher priority to earlier arriving requests), a priority associated with a particular radio (perhaps pre-stored at the arbitrating direct mode radio, based on a radio ID included in the request), a priority associated with a talkgroup to which the new call request is directed (again, perhaps pre-stored at the arbitrating direct mode radio, based on a radio ID included in the request), based on the type of call requested (emergency vs. non-emergency, group vs. private, etc.), or some other system or radio attribute. Assuming that the first new call request is determined at step 512 as entitled to priority over the other new call requests received at step 506, processing proceeds to step 510, where the arbitrating direct mode radio broadcasts a call grant granting the first new call request to the requesting direct mode radio, the call grant identifying a source ID of the requesting direct mode radio.

At step 514, the arbitrating direct mode radio determines whether it is interested in the granted first new call (perhaps in a manner similar to step 418 of FIG. 4), and if so, receives and plays back the content received from the requesting first direct mode radio over the direct mode channel, and correspondingly updates the identity of the last radio to transmit, at step 516. If, on the other hand, the arbitrating direct mode radio determines that it is not interested in the granted first new call, it refrains from receiving, decoding, and/or playing back the content transmitted by the first direct mode radio, but may still correspondingly update the identity of the last radio to transmit.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for resolving call collisions in a direct mode communication system among a plurality of direct mode radios, the method comprising, at an initiating direct mode radio:
   monitoring a direct mode communication channel for transmissions from other direct mode radios in the plurality of direct mode radios, wherein the direct mode communication system has no base station or repeater infrastructure, and wherein direct mode is a mode of operation where radios communicate directly with each other over a single shared RF frequency without the use of any infrastructure equipment;
   responsive to detecting a request to initiate a new direct mode call on the direct mode communication channel:
   identifying, via the monitoring, a last one of the other direct mode radios to transmit on the direct mode communication channel;
   transmitting a new call request for receipt by the last one of the other direct mode radios to transmit on the direct mode communication channel;
   monitoring the direct mode communication channel for a response from the last one of the other direct mode radios to transmit on the direct mode communication channel;
   if a call grant is received from the last one of the other direct mode radios to transmit on the direct mode communication channel granting the new call request, initiating the new direct mode call on the direct mode communication channel; and
   if the call grant is not received from the last one of the other direct mode radios to transmit on the direct mode communication channel granting the new call request, at least temporarily refraining from initiating the new direct mode call on the direct mode communication channel, thereby resolving potential call collisions.

2. The method of claim 1, further comprising:
   if the call grant is not received from the last one of the other direct mode radios to transmit on the direct mode communication channel granting the new call request, but a second call grant is received granting a second call request from another of the other direct mode radios to transmit on the direct mode communication channel, determining if the second call request is of interest, and if so, unmuting and playing back content transmitted in the second call by the another of the other direct mode radios.

3. The method of claim 1, further comprising:
   if the call grant is not received from the last one of the other direct mode radios to transmit on the direct mode communication channel granting the new call request, and no call grant of any other of the other direct mode radios to transmit on the direct mode communication channel is detected, waiting for a random period of time and then re-transmitting the call request directly to the last one of the other direct mode radios to transmit on the direct ode communication channel.

4. The method of claim 3, further comprising:
   after re-transmitting the call request directly to the last one of the other direct mode radios to transmit on the direct mode communication channel a threshold number of times without receiving a call grant granting the new call request and without detecting any other call grant, initiating the new direct mode call on the direct mode communication channel despite the non-receipt of the call grant from the last one of the other direct mode radios.

5. The method of claim 1, wherein:
   monitoring the direct mode communication channel for transmissions from other direct mode radios in the plurality of direct mode radios comprises monitoring the direct mode communication channel for transmissions including a particular system identifier with which the initiating direct mode radio is also associated with and includes in its transmissions.

6. The method of claim 5, wherein:
   identifying the last one of the other direct mode radios to transmit on the direct mode communication channel comprises identifying a last one of the other direct mode radios to transmit on the direct mode communication channel a transmission including the particular system identifier.

7. The method of claim 1, wherein:
   monitoring the direct mode communication channel for transmissions from other direct mode radios in the plurality of direct mode radios comprises, retrieving, via one of a link control header frame and embedded link control frame, an identity of a source radio transmitting on the direct mode communication channel and storing the identity;

identifying the last one of the other direct mode radios to transmit on the direct mode communication channel comprises retrieving the stored identity of the last source radio to transmit on the direct mode communication channel; and transmitting the call request for receipt by the last one of the other direct mode radios to transmit on the direct mode communication channel comprises populating a target device identifier field of a voice header or preamble control signaling block (CSBK), forming the call request, with the retrieved stored identity of the last source radio to transmit on the direct mode communication channel.

8. The method of claim 1, further comprising:

prior to detecting the request to initiate the new direct mode call, and during the monitoring, receiving an announcement from the last one of the last one of the other direct mode radios to transmit on the direct mode communication channel indicating that it will no longer be available to arbitrate new call requests; and re-transmitting the call request a reduced number of times compared to a number of times if the announcement had not been received, and responsive to not receiving the call grant from the last one of the other direct mode radios to transmit on the direct mode communication channel granting the new call request, initiating the new direct mode call on the direct mode communication channel despite the non-receipt of the call grant from the last one of the other direct mode radios.

9. The method of claim 1, wherein the plurality of direct mode radios communicate in accordance with a European Telecommunications Standard Institute-Digital Mobile Radio (ETSI-DMR) direct mode protocol.

10. The method of claim 1, wherein infrastructure equipment comprises: base stations, repeaters, and any and all other external network infrastructure equipment.

11. The method of claim 1, wherein the plurality of direct mode radios comprises five or more digital direct mode radios.

12. The method of claim 11, wherein the five or more digital direct mode radios are in a digital direct mode group call.

13. A direct mode radio, comprising:
a memory;
a transceiver comprising a transmitter and a receiver, and
a processor configured to:
  monitor, via the receiver, a direct mode communication channel for transmissions from other direct mode radios in a direct mode communication system having a plurality of direct mode radios without repeaters or base station infrastructure, wherein direct mode is a mode of operation where radios communicate directly with each other over a single shared RF frequency without the use of any infrastructure equipment;
  responsive to detecting a request to initiate a new direct mode call on the direct mode communication channel via the receiver;
    identify, via the monitoring, a last one of the other direct mode radios to transmit on the direct mode communication channel;
    transmit, via the transmitter, a new call request for receipt by the last one of the other direct mode radios to transmit on the direct mode communication channel;
    monitor, via the receiver, the direct mode communication channel for a response from the last one of the other direct mode radios to transmit on the direct mode communication channel;
    if a call grant is received from the last one of the other direct mode radios to transmit on the direct mode communication channel granting the new call request, initiate, via the transmitter, the new direct mode call on the direct mode communication channel; and
    if the call grant is not received from the last one of the other direct mode radios to transmit on the direct mode communication channel granting the new call request, at least temporarily refrain from initiating the new direct mode call on the direct mode communication channel, thereby resolving potential call collisions.

14. The direct mode radio of claim 13, wherein infrastructure equipment comprises: base stations, repeaters, and any and all other external network infrastructure equipment.

15. The method of claim 13, wherein the other direct mode radios comprise at least five digital direct mode radios.

16. The method of claim 15, wherein the five direct mode radios are in a digital direct mode group call.

* * * * *